US011227618B2

(12) United States Patent
Onizuka et al.

(10) Patent No.: US 11,227,618 B2
(45) Date of Patent: Jan. 18, 2022

(54) SOUND SIGNAL PROCESSING DEVICE, SOUND SIGNAL PROCESSING METHOD AND SOUND SIGNAL PROCESSING PROGRAM

(71) Applicant: AUDIO-TECHNICA CORPORATION, Tokyo (JP)

(72) Inventors: Kazuhiro Onizuka, Tokyo (JP); Toru Aikawa, Chiba (JP); Yasuhito Kikuhara, Tokyo (JP); Yuri Jitsukata, Kanagawa (JP)

(73) Assignee: AUDIO-TECHNICA CORPORATION, Tokyo (JP)

( * ) Notice: Subject to any disclaimer, the term of this patent is extended or adjusted under 35 U.S.C. 154(b) by 126 days.

(21) Appl. No.: 16/621,861

(22) PCT Filed: Mar. 15, 2018

(86) PCT No.: PCT/JP2018/010330
§ 371 (c)(1),
(2) Date: Dec. 12, 2019

(87) PCT Pub. No.: WO2018/230062
PCT Pub. Date: Dec. 20, 2018

(65) Prior Publication Data
US 2020/0105289 A1    Apr. 2, 2020

(51) Int. Cl.
*G10L 21/0232* (2013.01)
*H04R 1/40* (2006.01)
(Continued)

(52) U.S. Cl.
CPC .......... *G10L 21/0232* (2013.01); *H04R 1/406* (2013.01); *H04R 3/005* (2013.01); *G10L 2021/02082* (2013.01); *H04M 9/082* (2013.01)

(58) Field of Classification Search
USPC ............ 381/66, 71.1; 379/3, 406.01, 406.05, 379/392.01
See application file for complete search history.

(56) References Cited

U.S. PATENT DOCUMENTS

| 5,323,458 A | * | 6/1994 | Park | H04M 9/082 |
| | | | | 379/391 |
| 2011/0019833 A1 | * | 1/2011 | Kuech | H04M 9/082 |
| | | | | 381/66 |

FOREIGN PATENT DOCUMENTS

| CN | 1750573 A | 3/2006 |
| CN | 101192411 A | 6/2008 |

(Continued)

*Primary Examiner* — Yosef K Laekemariam
(74) *Attorney, Agent, or Firm* — W&C IP

(57) ABSTRACT

A sound signal processing device, a sound signal processing method, and a sound signal processing program can remove echo signals included in input signals from a plurality of microphones with a simple circuit configuration are provided.

The present device 1 includes an output part 20 that outputs a reception signal s2, an input part 30 that combines signals input from each of a plurality of microphones 3 and generates a transmission signal s4, wherein the microphones 3 collect an echo component of the reception signal and voice of a speaker and generate an echo signal es corresponding to the echo component and a sound signal s1 corresponding to the voice of the speaker, a removal signal generator 70 that generates a removal signal s5 removing the echo signal included in the transmission signal based on a filter coefficient F, a controller 50 that calculates the filter coefficient, and a removal part 80 that generates an echo removal signal s6 based on the transmission signal and the removal signal. The controller calculates individual filter coefficients k cor- (Continued)

responding to the respective microphones, and calculate the filter coefficient by combining the individual filter coefficients.

18 Claims, 12 Drawing Sheets

(51) Int. Cl.
*H04R 3/00* (2006.01)
*G10L 21/0208* (2013.01)
*H04M 9/08* (2006.01)

(56) References Cited

FOREIGN PATENT DOCUMENTS

| | | | | |
|---|---|---|---|---|
| CN | 101471694 A | 7/2009 | | |
| JP | 64-12648 | * 1/1989 | ............. | H04M 1/60 |
| JP | 64-012648 A | 1/1989 | | |
| JP | 2001-251224 A | 9/2001 | | |
| JP | 2002-252577 A | 9/2002 | | |
| JP | 2005-323308 A | 11/2005 | | |
| JP | 2005-347957 A | 12/2005 | | |
| WO | 2005/076663 A1 | 8/2005 | | |

\* cited by examiner

SOUND SIGNAL PROCESSING DEVICE, SOUND SIGNAL PROCESSING METHOD AND SOUND SIGNAL PROCESSING PROGRAM

TECHNICAL FIELD

The present invention relates to a sound signal processing device, a sound signal processing method, and a sound signal processing program.

BACKGROUND ART

In recent years, communication conference systems, for example, telephone conference systems and television conference systems using communication lines such as the Internet, have been used for conferences between physically distant bases. In such communication conference systems, an acoustic echo is generated by collecting sound output from a loudspeaker at one base based on a sound signal (hereinafter referred to as "reception signal") received from another base by a microphone at one base.

An acoustic echo is generally suppressed or removed with an echo canceller included in a communication conference system. An ordinary echo canceller includes an adaptive filter that generates a removal signal to remove an echo signal based on the reception signal and the echo signal corresponding to the acoustic echo. The echo canceller removes the echo signal by performing addition or subtraction on the removal signal and the echo signal.

A multi-channel support echo canceller has been proposed as the above-mentioned echo canceller. The multi-channel support echo canceller suppresses and/or removes echo signals from a plurality of microphones (for example, see Japanese Unexamined Patent Application Publication No. 2002-252577).

SUMMARY OF INVENTION

Technical Problem

The echo canceller disclosed in Japanese Unexamined Patent Application Publication No. 2002-252577 includes a plurality of echo cancel parts corresponding to respective microphones. By removing the echo signals included in input signals from the microphones corresponding to the respective echo cancel parts, the echo canceller supports multi-channels. The echo canceller disclosed in Japanese Unexamined Patent Application Publication No. 2002-252577 requires echo cancellers of the same number as that of the microphones. Therefore, the circuit configuration and signal processing are complicated.

An object of the present invention is to solve the problem described above and to provide a sound signal processing device, a sound signal processing method, and a sound signal processing program that can remove echo signals included in respective input signals from a plurality of microphones with a simple circuit configuration.

Solution to Problem

The sound signal processing device according to the present invention includes: an output part that outputs a reception signal; an input part that combines signals input from each of a plurality of microphones and generates a transmission signal, wherein the microphones collect an echo component of the reception signal and voice of a speaker and generate an echo signal corresponding to the echo component and a sound signal corresponding to the voice of the speaker; a removal signal generator that generates a removal signal for removing the echo signal included in the transmission signal, based on a filter coefficient; a controller that calculates the filter coefficient; and a removal part that generates an echo removal signal based on the transmission signal and the removal signal, wherein the controller calculates individual filter coefficients corresponding to the respective microphones, and calculates the filter coefficient by combining the individual filter coefficients.

Advantageous Effects of Invention

According to the present invention, echo signals included in input signals from each of a plurality of microphones can be removed with a simple circuit configuration.

DESCRIPTION OF EMBODIMENTS

Embodiments of a sound signal processing device, a sound signal processing method, and a sound signal processing program according to the present invention will now be described with reference to the attached drawings.

Sound Signal Processing Device

Embodiments of a sound signal processing device according to the present invention (hereinafter referred to as "the present device") will now be described.

Configuration of Sound Signal Processing Device

Figure 1:
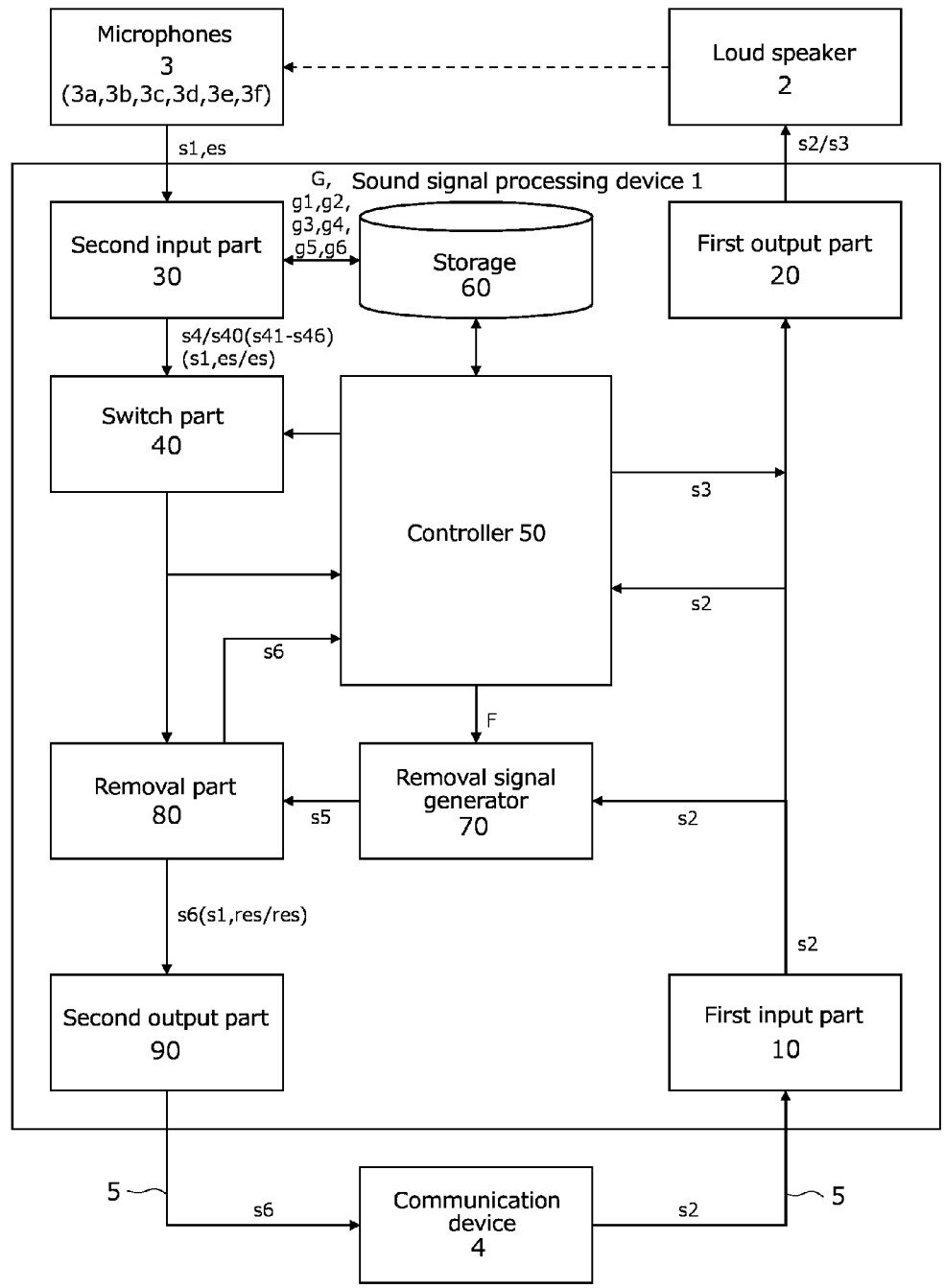
FIG. 1 is a functional block diagram illustrating an embodiment of a sound signal processing device according to the present invention.

FIG. 1 is a functional block diagram illustrating an embodiment of the present device.

The present device 1 performs processing, such as mixing, distribution, balance adjustment, for signals (input signals) from devices, such as microphones 3 that converts voice and music into electrical signals. The present device 1 is, for example, a mixer.

In the following explanation, for example, the present device 1 is used in a television conference performed between a speaker in a first base and a speaker in a second base physically distant from the first base. The present device 1 is installed in the first base. In addition, the present device 1 is connected with a loudspeaker 2 disposed in the first base, and with six microphones $3a$, $3b$, $3c$, $3d$, $3e$, and $3f$ (six channels). The first base and the second base are, for example, rooms, such as conference rooms.

Part of voice (sound) from the second base which is output to the indoor space of the first base from the loudspeaker 2 is collected with the microphones 3 through the indoor space. At this stage, the microphones 3 generate and output a signal (hereinafter referred to as "echo signal") es corresponding to the part (hereinafter referred to as "echo component") of voice (sound) output from the loudspeaker 2. The microphones 3 generate and output a signal (hereinafter referred to as "sound signal") s1 corresponding to the voice of the speaker, when the speaker at the first base speaks. Specifically, when the speaker at the first base and the speaker at the second base are speaking, the signals output from the microphones 3 includes the sound signal s1 and the echo signal es. In contrast, when only the speaker at the second base is speaking, the signals output from the microphones 3 includes the echo signal es.

The present device 1 includes a first input part 10, a first output part 20, a second input part 30, a switch part 40, a controller 50, a storage 60, a removal signal generator 70, a removal part 80, and a second output part 90.

The present device 1 is provided with, for example, a personal computer. In the present device 1, an information processing program according to the present invention (hereinafter referred to as "the present computer program") provides a sound signal processing method according to the below-mentioned present invention (hereinafter referred to as "the present method") in cooperation with hardware resources of the present device 1.

It should be noted that, causing a computer (not illustrated) to execute the present computer program can cause the computer to function in the same manner as the present device so as to cause the computer to execute the present method.

The first input part 10 is connected with a communication device 4 of the second base via a communication line 5, such as a communication cable, and receives a sound signal (hereinafter referred to as "reception signal") s2 from the second base. The first input part 10 is provided with, for example, a communication interface (I/F), such as a connector and/or a terminal, and an amplifier. The reception signal s2 from the first input part 10 is input to the first output part 20, the controller 50, and the removal signal generator 70.

The first output part 20 outputs the reception signal s2 from the first input part 10 and/or a reference signal s3 from the controller 50 to the loudspeaker 2. The first output part 20 is provided with, for example, an I/F and an amplifier. The first output part 20 is served as an output part in the present invention. The "reference signal s3" is a signal corresponding to reference sound (for example, white noise) emitted through the loudspeaker 2 when the present device 1 executes the below-mentioned present method. The reference signal s3 is generated by the controller 50.

The second input part 30 is connected with each of the microphones $3a$ to $3f$, and receives signals from the respective microphones $3a$ to $3f$. The second input part 30 is provided with, for example, an I/F, an amplifier, an AD converter, and a variable resistor. The second input part 30 is served as an input part in the present invention. The second input part 30 generates signals (hereinafter "individual transmission signal") s41, s42, s43, s44, s45, and s46 acquired by adjusting gain of the respective received signals, and generates a signal (hereinafter referred to as "transmission signal") s4 acquired by combining the individual transmission signals s41 to s46. Specifically, the second input part 30 combines the individual transmission signals s41 to s46, in other words, signals from the respective microphones $3a$ to $3f$ to generate a transmission signal s4. The second input part 30 includes seven transmission paths (not illustrated) corresponding to the generated transmission signal s4 and the respective individual transmission signals s41 to s46. The generated transmission signal s4 and the individual transmission signals s41 to s46 are input to the switch part 40. Hereinafter, when the individual transmission signals s41 to s46 are generically referred to without distinguishing them from each other, the individual transmission signals s41 to s46 are referred to as individual transmission signals s40.

Gain adjustment for the respective signals is executed using a publicly known gain sharing algorithm. The "gain-sharing" algorithm is an algorithm comparing the input from each of the microphones $3a$ to $3f$ with the sum total of the inputs (for example, comparing the input when the signal is input only from the microphone $3a$ with the input when signals are input from the microphones $3a$ to $30$ and adjusting the gain values g1, g2, g3, g4, g5, and g6 set for the transmission paths (amplifiers) of signals from the respective microphones $3a$ to $3f$ such that the total gain value G has a fixed value. In other words, gain sharing is an algorithm adjusting the gain values g1 to g6 corresponding to the respective microphones $3a$ to $3f$ such that the total gain value G of the transmission paths has a fixed value. The gain values g1 to g6 set for the respective transmission paths are stored in the storage 60. Hereinafter, when the gain values g1 to g6 are generically referred to without distinguishing them from each other, the gain values g1 to g6 are referred to as gain values g.

The transmission signal s4 and the individual transmission signals s41 to s46 are generated based on the signals from the respective microphones $3a$ to $3f$, as described above. Specifically, the transmission signal s4 and the individual transmission signals s41 to s46 include a sound signal s1 and an echo signal es when the speaker at the first base is speaking, and include an echo signal es when the speaker at the first base is not speaking.

The switch part 40 switches the signal input from the second input part 30 to the controller 50 and/or the removal part 80, by switching the transmission path of the second input part 30 based on the switching signal from the controller 50. Specifically, the switch part 40 switches the signal input to the controller 50 and/or the removal part 80, among the individual transmission signals s40 corresponding to the six microphones $3a$ to $3f$ and the transmission signal s4. The switch part 40 is provided with, for example, a rotary switch or a slide switch. Operations of the switch part 40 will be described later.

The controller 50 executes, for example, calculation of coefficients required for the present device 1 to execute the below-mentioned present method, detection of the sound signal s1 and/or the reception signal s2, and measurement of echo return loss. The controller 50 is provided with, for example, a processor, such as a central processing unit (CPU), a micro processing unit (MPU), and a digital signal processor (DSP), and/or an integrated circuit, such as an application specific integrated circuit (ASIC) and a field programmable gate array (FPGA). Operations of the controller 50 and the echo return loss will be described later.

The storage 60 stores therein information required for the present device 1 to execute the below-mentioned present method. The storage 60 is provided with, for example, a recording device, such as a hard disk drive (HDD) and a solid state drive (SSD), and/or a semiconductor memory device, such as a random access memory (RAM) and a flash memory. The information stored in the storage 60 will be described later.

The removal signal generator 70 generates a removal signal s5 based on the reception signal s2 and a filter coefficient F. The removal signal generator 70 is, for example, a publicly known finite impulse response (FIR) filter. The "removal signal s5" is a signal that removes (suppresses) the echo signal es included in the transmission signal s4. Specifically, for example, the removal signal s5 is a signal of the same phase (or approximately equal to the same phase) as that of the echo signal es included in the transmission signal s4. Generation of the removal signal s5 with the removal signal generator 70 will be described later.

The "filter coefficient F" is a coefficient used by the removal signal generator 70 to execute FIR processing on the reception signal s2 and generate the removal signal s5. Specifically, the removal signal generator 70 executes FIR processing on the reception signal s2 based on the filter coefficient F and generates the removal signal s5. The filter coefficient F is calculated by the controller 50, as described above. Calculation of the filter coefficient F with the controller 50 will be described later.

The removal part 80 removes the echo signal es included in the transmission signal s4, based on the transmission signal s4 and the removal signal s5, and generates an echo removal signal s6. The removal part 80 is, for example, an arithmetic circuit, such as a subtraction circuit and an addition circuit. Generation of the echo removal signal s6 with the removal part 80 will be described later.

The "echo removal signal s6" is a signal acquired by removing (suppressing) the echo signal es from the transmission signal s4. The echo removal signal s6 includes the sound signal s1 and a residual echo signal res when the speaker at the first base is speaking, and includes a residual echo signal res when the speaker at the first base is not speaking. The "residual echo signal res" is a difference signal between the echo signal es and the removal signal s5. Specifically, for example, when the removal signal s5 has completely removed the echo signal es (when the echo signal es has the same phase as that of the removal signal s5), the signal level of the residual echo signal res generated by subtraction of the signals is "0". The echo removal signal s6 is input to the controller 50 and the second output part 90.

The second output part 90 is connected with the communication line 5, and outputs the echo removal signal s6 to the communication line 5. The second output part 90 is provided with, for example, an I/F and an amplifier. The echo removal signal s6 from the second output part 90 is input to the communication device 4 at the second base via the communication line 5.

Sound Signal Processing Method

The present method will now be described.

Figure 2:
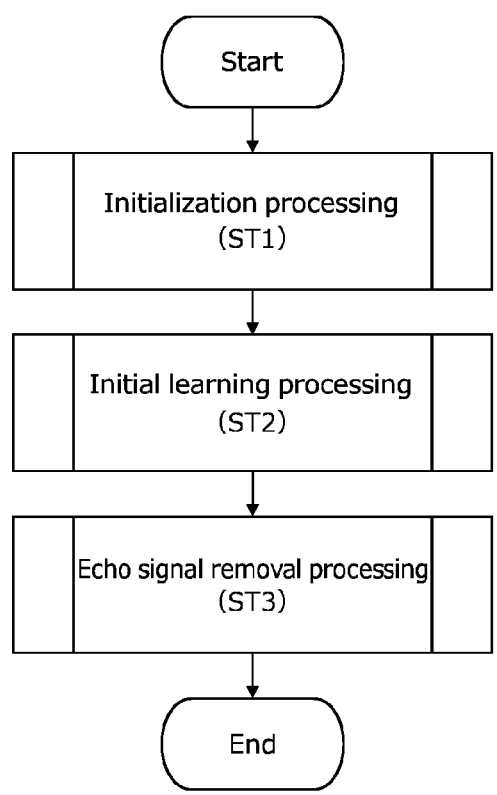
FIG. 2 is a flowchart illustrating an embodiment of a sound signal processing method according to the present invention.

FIG. 2 is a flowchart illustrating an embodiment of the present method.

In the present method, the present device 1 executes initialization processing (ST1), initial learning processing (ST2), echo signal removal processing (ST3), the below-mentioned specification processing (ST4) (see FIG. 8), and the below-mentioned update processing (ST5) (see FIG. 10).

In the present method, the present device 1 executes each of the processing (ST1 to ST5) to provide echo canceling supporting the six microphones 3 (six channels) with a common FIR filter (removal signal generator 70) and is automatically ready for environmental change as described later.

The present device 1 executes initialization processing (ST1) after the power of the present device 1 is turned on.

Initialization Processing

Figure 3:
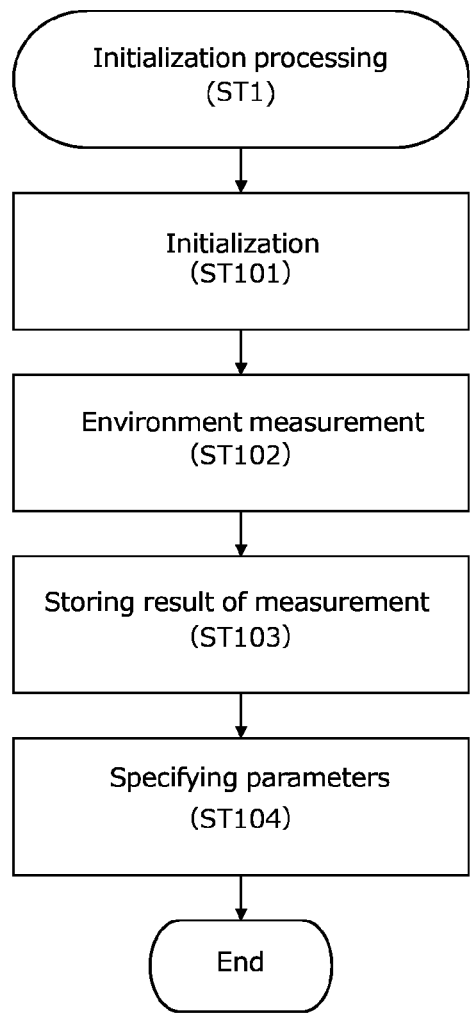
FIG. 3 is a flowchart of initialization processing included in the sound signal processing method of FIG. 2.

FIG. 3 is a flowchart of initialization processing (ST1).

The "initialization processing (ST1)" is processing to execute initialization of parameters and environment measurement.

First, the present device 1 executes initialization of parameters (ST101). The "parameters" is values set for the algorithm (adaptive algorithm) used for calculation of the below-described individual filter coefficient k.

Then, the present device 1 executes, using the controller 50, environment measurement for the first base in which the present device 1, the loudspeaker 2, and the microphones 3 are installed (ST102). The "environment measurement" is measurement of items (such as the reverberation time, the delay time, the maximum echo quantity, and background noise) relating to the transmission path (environment) of the echo component from the loudspeaker 2 to the microphones 3 in the first base in which the present device 1, the loudspeaker 2, and the microphones 3 are installed. The present device 1 outputs reference sound into the first base through the loudspeaker 2, and collects the echo component of the reference sound through the microphones 3. The controller 50 measures the reverberation time, the delay time, the maximum echo quantity, and the background noise. The environment measurement is executed for each of the microphones $3a$ to $3f$.

The "reverberation time" is time required from the time at which the reference sound is output (emitted) into the first base and the output of the reference sound is stopped, to the time at which the energy density of its reverberation sound is attenuated by 60 dB. The "delay time" is time required for the microphones 3 to collect the reference sound output from the loudspeaker 2. The "maximum echo quantity" is the maximum quantity of the echo component collected by the microphones 3 in the first base. The "background noise" is a sound pressure level of noise (such as noise of the air conditioner and noise of automobiles outside the room) in the first base.

The present device 1 then stores a measurement result of environment measurement corresponding to the respective microphones $3a$ to $3f$ in the storage 60 (ST103).

The present device 1 then specifies parameters based on the measurement result of environment measurement corresponding to the respective microphones $3a$ to $3f$ (ST104). The parameters are specified by being newly calculated based on the measurement results of environment measurement. As another example, the parameters are specified by selection of one parameter group from a plurality of parameter groups stored in advance in the storage 60, based on the measurement results of environment measurement.

Initial Learning Processing

Figure 4:
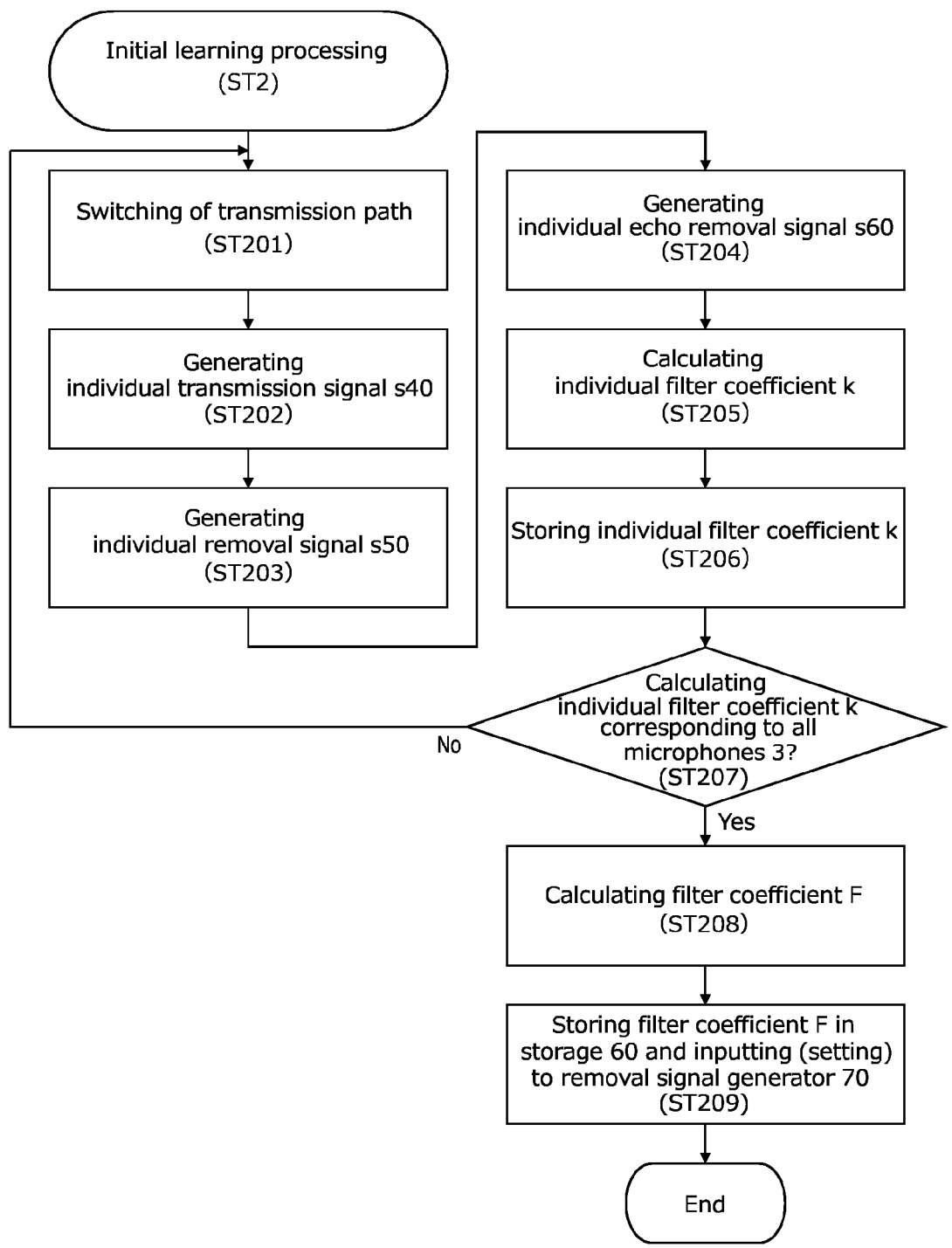
FIG. 4 is a flowchart of initial learning processing included in the sound signal processing method of FIG. 2.

FIG. 4 is a flowchart of the initial learning processing (ST2).

Figure 5:
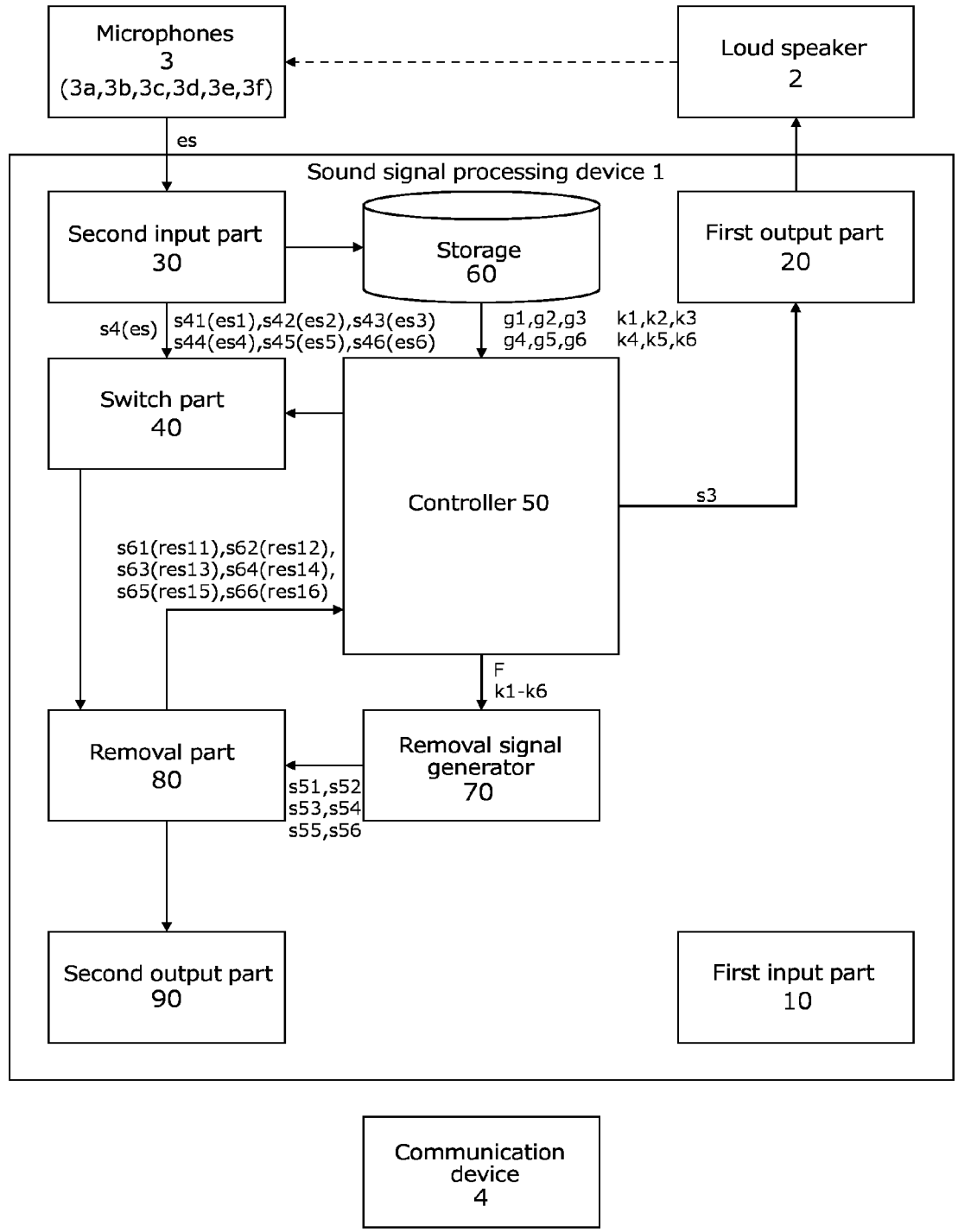
FIG. 5 is a functional block diagram illustrating flow of signals in the initial learning processing of FIG. 4.

FIG. 5 is a functional block diagram illustrating flow of signals in the initial learning processing (ST2).

In FIG. 5, main flows in flows of signals in the initial learning processing (ST2) are denoted with arrows.

The "initial learning processing (ST2)" is processing to initially calculate (learn) the filter coefficient F with the present device 1, for example, after the power of the present device 1 is turned on.

First, the present device 1 switches the transmission path of the second input part 30 to the transmission path from the microphone 3a using the switch part 40 and the controller 50 (ST201). Switching of the transmission path with the switch part 40 is executed based on a switching signal from the controller 50.

Then, the present device 1 generates an individual transmission signal s41 corresponding to the microphone 3a using the second input part 30 (ST202). In the processing (ST202), the controller 50 generates a reference signal s3 and inputs the reference signal s3 to the first output part 20. The present device 1 outputs reference sound from the loudspeaker 2, and collects the echo component of the reference sound with the microphone 3 (microphone 3a) corresponding to the transmission path switched in the above-mentioned processing (ST201). The second input part 30 generates an individual transmission signal s41 corresponding to the microphone 3a based on the signal input from the microphone 3a. The individual transmission signal s41 includes an echo signal es corresponding to the echo component of the reference sound. The individual transmission signal s41 is input from the second input part 30 to the removal part 80 through the switch part 40.

The present device 1 then generates an individual removal signal s51 using the controller 50 and the removal signal generator 70 (ST203). The "individual removal signal s51" is a signal that removes the echo signal (hereinafter referred to as "individual echo signal") es1 included in the individual transmission signal s41. Hereinafter, when the individual removal signals s51 to s56 are generically referred to without distinguishing them from each other, the individual removal signals s51 to s56 are referred to as individual removal signals s50.

In the processing (ST203), the controller 50 reads an initial value of the individual filter coefficient k1 corresponding to the microphone 3a from the storage 60, and inputs (sets) the initial value to (in) the removal signal generator 70. The removal signal generator 70 calculates the individual removal signal s51 based on the reference signal s3 and the individual filter coefficient k1. The individual removal signal s51 is input to the removal part 80.

The "individual filter coefficient k1" is a transfer function of the acoustic transmission path reaching the microphone 3a from the loudspeaker 2. Specifically, the individual filter coefficient k1 is a coefficient used by the removal signal generator 70 to execute FIR processing for the reference signal and generate the individual removal signal s51. The "reference signal" is a basis of a signal for the removal signal generator 70 to generate an individual removal signal s51 based on the individual filter coefficient k1 (the reference signal is the reference signal s3 in the initial learning processing (ST2), and the reception signal s2 in the echo signal removal processing (ST3), the specification processing (ST4), and the update processing (ST5)).

The present device 1 then removes an individual echo signal es1 included in the individual transmission signal s41, and generates an individual echo removal signal s61 using the removal part 80 (ST204). In the processing (ST204), the removal part 80 generates an individual echo removal signal s61 based on the individual transmission signal s41 and the individual removal signal s51. The individual echo removal signal s61 is input from the removal part 80 to the controller 50 and the second output part 90. At this stage, the second output part 90 mutes the individual echo removal signal s61. As a result, the individual echo removal signal s61 is not transmitted to the second base.

It should be noted that the second output part may attenuate the individual echo removal signal, or mute the individual echo removal signal and transmit dummy noise (pink noise) to the second base.

The "individual echo removal signal s61" is a signal acquired by removing (suppressing) the individual echo signal es1 from the individual transmission signal s41. The individual echo removal signal s61 includes an individual residual echo signal res11. Hereinafter, when the individual echo removal signals s61 to s66 are generically referred to without distinguishing them from each other, the individual echo removal signals s61 to s66 are referred to as individual echo removal signals s60. The "individual residual echo signal res11" is a difference signal between the individual echo signal es1 and the individual removal signal s51. The removal part 80 generates the individual echo removal signal s61 by subtracting the individual removal signal s51 from the individual transmission signal s41. Hereinafter, when the individual residual echo signals res11 to res16 are generically referred to without distinguishing them from each other, the individual residual echo signals res11 to res16 are referred to as individual residual echo signals res10.

The present device 1 then calculates an individual filter coefficient k1 corresponding to the microphone 3a using the controller 50 (ST205). In the processing (ST205), the controller 50 reads, from the storage 60, a gain value g1 (corresponding to the microphone 3a) set for the transmission path of the signal from the microphone 3a. The controller 50 then calculates the individual filter coefficient k1 corresponding to the microphone 3a using the publicly known adaptive algorithm, based on the read gain value g1, the reference signal s3, and the individual echo removal signal s61 (that is, the individual residual echo signal res11 included in the individual echo removal signal s61).

The calculated individual filter coefficient k1 is stored in the storage 60 (ST206). As a result, the individual filter coefficient k1 stored in the storage 60 is updated from the initial value to the calculated value.

The present device 1 repeats the processing (ST201 to ST206) until the individual filter coefficients k1 to k6 corresponding to all the microphones 3a to 3f are calculated ("NO" at ST207). In the processing, as described above, the parameters of the adaptive algorithm are specified based on the measurement result of environment measurement corresponding to the respective microphones 3. In other words, the controller 50 calculates individual filter coefficients k corresponding to the respective microphones 3 based on the measurement results of environment measurement corresponding to the respective microphones 3.

When the individual filter coefficients k1 to k6 corresponding to all the microphones 3a to 3f are calculated ("YES" at ST207), the present device 1 calculates a filter coefficient F using the controller 50 (ST208). In the processing (ST208), the controller 50 reads, from the storage 60, the gain values g1 to g6 of the transmission paths of signals from the respective microphones 3a to 3f, and the individual filter coefficients k1 to k6 and calculates the filter coefficient F based on the gain values g1 to g6 and the individual filter coefficients k1 to k6. The filter coefficient F is calculated by combining the individual filter coefficients k1 to k6. Hereinafter, when the individual filter coefficients k1 to k6 are generically referred to without distinguishing them from each other, the individual filter coefficients k1 to k6 are referred to as individual filter coefficients k.

Composition of the individual filter coefficients k1 to k6 are executed by multiplying the individual filter coefficient k by the gain value g for each of the individual filter coefficients k1 to k6 corresponding to the respective microphones 3a to 3f, and adding the multiplication results. Specifically, the filter coefficient F is calculated by adding a value acquired by multiplying the individual filter coefficient k1 corresponding to the microphone 3a by the gain value g1, a value acquired by multiplying the individual filter coefficient k2 corresponding to the microphone 3b by the gain value g2, a value acquired by multiplying the individual filter coefficient k3 corresponding to the microphone 3c by the gain value g3, a value acquired by multiplying the individual filter coefficient k4 corresponding to the microphone 3d by the gain value g4, a value acquired by multiplying the individual filter coefficient k5 corresponding to the microphone 3e by the gain value g5, and a value acquired by multiplying the individual filter coefficient k6 corresponding to the microphone 3f by the gain value g6.

The calculated filter coefficient F is stored in the storage 60 and input to (set in) the removal signal generator 70 (ST209). As a result, the removal signal generator 70 can generate the removal signal s5 based on the filter coefficient F.

As described above, the present method calculates the filter coefficient F by calculating the individual filter coefficients k1 to k6 corresponding to the respective microphones 3a to 3f and combining the individual filter coefficients k1 to k6. Therefore, the present device 1 can remove echo signals es included in signals from the respective microphones 3a to 3f with one echo cancel part (corresponding to the controller 50, the removal signal generator 70, and the removal part 80) as opposed to a conventional device including echo cancel parts for respective microphones. Specifically, the present device 1 executes echo canceling with a common FIR filter (removal signal generator 70) for inputs from the six microphones 3a to 3f. Specifically, the present device 1 can remove echo signals es included in signals from the respective microphones 3a to 3f with a simple circuit configuration in comparison with a conventional device.

Echo Signal Removal Processing

Figure 6:
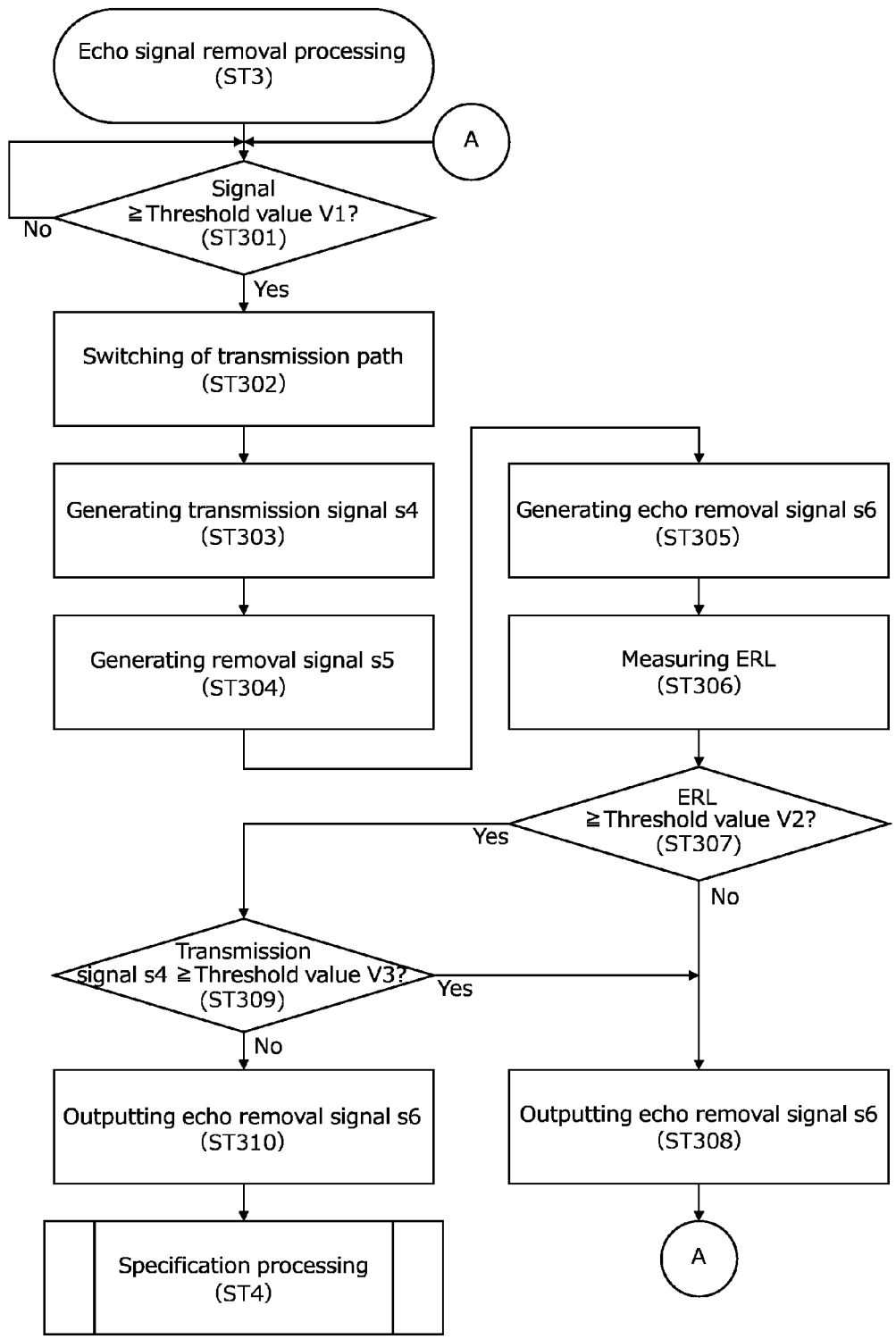
FIG. 6 is a flowchart of echo signal removal processing included in the sound signal processing method of FIG. 2.

FIG. 6 is a flowchart of echo signal removal processing (ST3).

Figure 7:
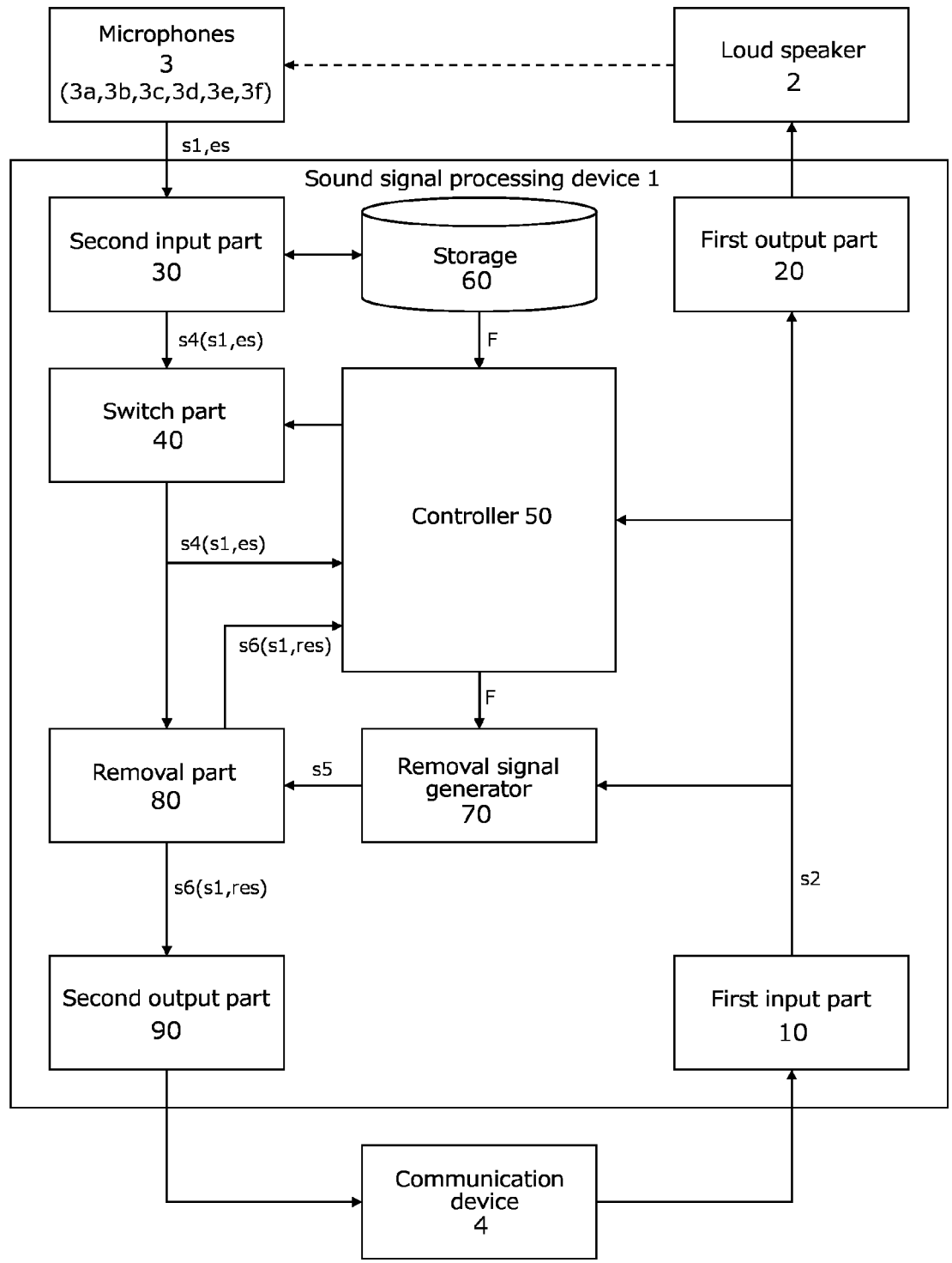
FIG. 7 is a functional block diagram illustrating flow of signals in the echo signal removal processing of FIG. 6.

FIG. 7 is a functional block diagram illustrating flow of signals in the echo signal removal processing (ST3).

In FIG. 7, main flows in flows of signals in the echo signal removal processing (ST3) are denoted with arrows.

The "echo signal removal processing (ST3)" is processing to remove the echo signal es corresponding to the reception signal s2 from the transmission signal s4. The echo signal removal processing (ST3) is processing executed when the reception signal s2 is included in the signal received by the first input part 10, such as in a conference between the first base and the second base. As described above, the signal (reception signal s2) from the first input part 10 is input to the first output part 20, the controller 50, and the removal signal generator 70.

First, the present device 1 detects, using the controller 50, whether a reception signal s2 is included in the signal from the first input part 10, that is, presence/absence of the reception signal s2 (ST301). In the processing (ST301), the controller 50 compares, for example, the signal (signal level) from the first input part 10 with a predetermined threshold value V1, to detect presence/absence of a reception signal s2. When a reception signal s2 is present, the transmission signal s4 includes the echo signal es corresponding to the reception signal s2.

The "threshold value V1" is a threshold value used by the controller 50 to detect whether a reception signal s2 is included in the signal from the first input part 10. The threshold value V1 is stored in the storage 60.

When the signal (signal level) from the first input part 10 is smaller than the threshold value V1 (when no reception signal s2 is present) ("NO" at ST301), the present device 1 repeats detection of presence/absence of the reception signal s2.

In contrast, when the signal from the first input part 10 is equal to or larger than the threshold value V1 (when a reception signal s2 is present) ("YES" at ST301), the present device 1 switches the transmission path of the second input part 30 to the transmission path of the signal s4 using the switch part 40 and the controller 50 (ST302).

The present device 1 then generates a transmission signal s4 using the second input part 30 (ST303). The transmission signal s4 is input from the second input part 30 to the controller 50 and the removal part 80 via the switch part 40.

The present device 1 then generates a removal signal s5 using the controller 50 and the removal signal generator 70 (ST304). In the processing (ST304), the controller 50 reads the filter coefficient F from the storage 60 and inputs (sets) the filter coefficient F to (in) the removal signal generator 70. The removal signal generator 70 generates a removal signal s5 from the reception signal s2 based on the filter coefficient F input from the controller 50. The filter coefficient F is the filter coefficient F calculated in the initial learning processing (ST2), or the filter coefficient F calculated and updated in the below-mentioned update processing (ST5).

The present device 1 then removes the echo signal es included in the transmission signal s4 and generates an echo removal signal s6 using the removal part 80 (ST305). In the processing (ST305), the removal part 80 generates an echo removal signal s6 based on the transmission signal s4 and the removal signal s5. The echo removal signal s6 is input to the controller 50 and the second output part 90.

The present device 1 then measures echo return loss (ERL) using the controller 50 (ST306).

The "ERL" is a level difference between the transmission signal s4 and the echo removal signal s6, that is, magnitude (signal level) of the residual echo signal res included in the echo removal signal s6. The ERL is influenced by, for example, change in installation location of the microphones 3 and/or fluctuations in output level of the loudspeaker 2. Specifically, for example, the ERL deteriorates when the position of the microphones 3 is moved by the speaker and the transmission path of the echo component is changed (environmental change). The controller 50 measures the ERL based on the signal level of the transmission signal s4 and the signal level of the echo removal signal s6. Specifically, the controller 50 measures the ERL by subtracting the signal level of the echo removal signal s6 from the signal level of the transmission signal s4.

The present device 1 then compares the measured ERL with a predetermined threshold value V2 using the controller 50 (ST307). The "threshold value V2" is a threshold value indicating whether removal of the echo signal es with the present device 1 is sufficient (whether the signal level of the residual echo signal res is large). Specifically, when removal of the echo signal es with the present device 1 is insufficient, the ERL is equal to or larger than the threshold value V2 (deteriorates). In contrast, when removal of the echo signal es with the present device 1 is sufficient, the ERL is smaller than the threshold value V2. The threshold value V2 is a reference value in the present invention. The threshold value V2 is stored in the storage 60.

When the ERL is smaller than the threshold value V2 ("NO" at ST307), the present device 1 outputs the echo removal signal s6 to the communication device 4 at the second base using the second output part 90 (ST308). The process of the present device 1 then returns to the processing (ST301).

In contrast, when the ERL is equal to or larger than the threshold value V2 ("YES" at ST307), the present device 1 detects whether a sound signal s1 is included in the transmission signal s4 (presence/absence of a sound signal s1), using the controller 50 (ST309). In the processing (ST309), the controller 50 detects presence/absence of a sound signal s1 by, for example, comparing the transmission signal s4 (signal level) from the second input part 30 with a predetermined threshold value V3.

The "threshold value V3" is a threshold value used by the controller 50 to detect whether a sound signal s1 is included in the transmission signal s4 from the second input part 30. The threshold value V3 is stored in the storage 60.

When the signal level of the transmission signal s4 is equal to or larger than the threshold value V3 (when a sound signal s1 is present) ("YES" at ST309), the present device 1 outputs the echo removal signal s6 to the communication device 4 at the second base using the second output part 90 (ST308). The process of the present device 1 then returns to the processing (ST301).

In contrast, when the signal level of the transmission signal s4 is smaller than the threshold value V3 (when no sound signal s1 is present) ("NO" at ST309), the present device 1 outputs the echo removal signal s6 to the communication device 4 at the second base using the second output part 90 (ST310), and executes the specification processing (ST4).

As described above, when the ERL is equal to or larger than the threshold value V2, the present device 1 executes the specification processing (ST4) at a timing when a reception signal s2 is present and no sound signal s1 is present. Specifically, the present device 1 executes the specification processing (ST4) when an echo signal es is included in the transmission signal s4 and no sound signal s1 is included in the transmission signal s4, based on a comparison result between the ERL and the threshold value V2. In other words, the present device 1 executes the specification processing (ST4) when the present device 1 senses environmental change during execution of the echo signal removal processing (ST3).

It should be noted that when the value of the ERL is measured as a negative value, the threshold value V2 is a negative value. In this case, the present device can reverse comparison in value between the ERL and the threshold value V2 at the above-mentioned processing (ST307). Specifically, for example, when the ERL being a negative value is equal to or smaller than the threshold value V2, the present device may detect whether a sound signal is included in the transmission signal (presence/absence of a sound signal) using the controller.

Specification Processing

Figure 8:
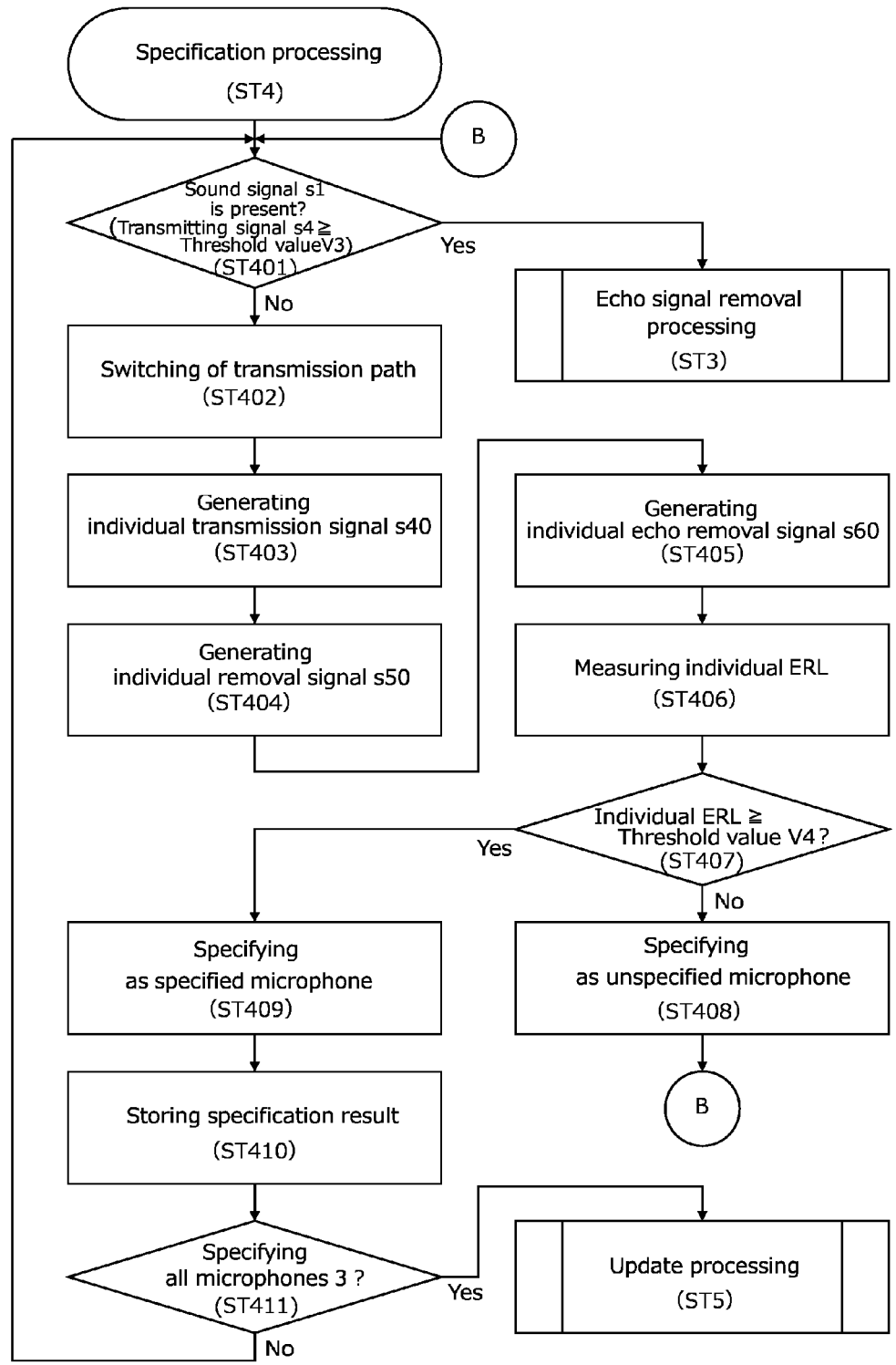
FIG. 8 is a flowchart of specification processing included in the signal processing of FIG. 6.

FIG. 8 is a flowchart of the specification processing (ST4).

Figure 9:
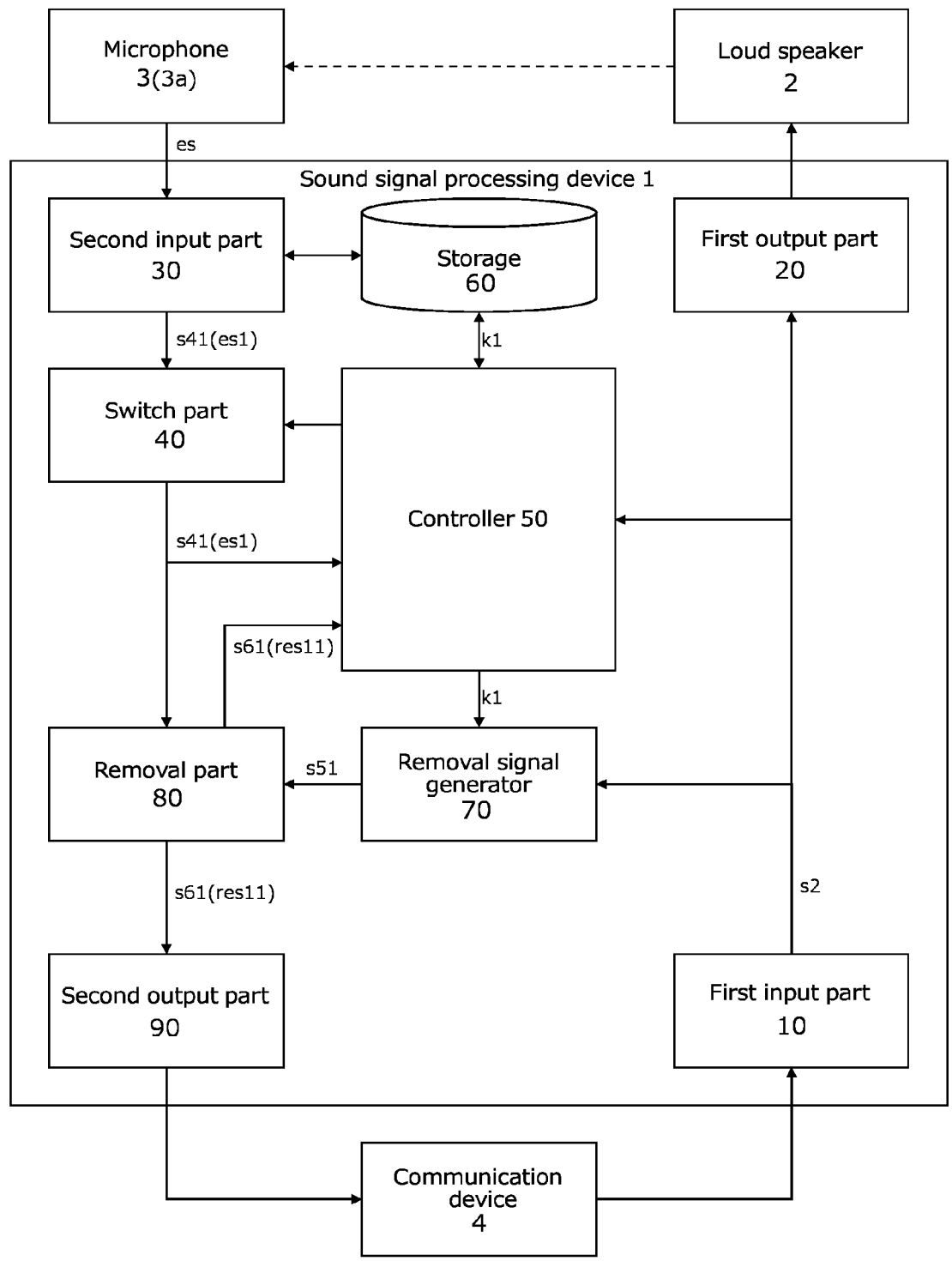
FIG. 9 is a functional block diagram illustrating flow of signals in the specification processing of FIG. 8.

FIG. 9 is a functional block diagram illustrating flow of signals in the specification processing (ST4).

In FIG. 9, main flows in flows of signals in the specification processing (ST4) are denoted with arrows. FIG. 9 illustrates only signals corresponding to signals from the microphone 3a among the microphones 3a to 3f, for convenience' sake.

The "specification processing (ST4)" is processing to specify each of the microphones 3 as a specified microphone or an unspecified microphone. The "specified microphone" is a microphone 3 with a corresponding individual filter coefficient k that is improper (shifted). Specifically, the specified microphone is a microphone 3 that is a target of update of the individual filter coefficient k. Deterioration of the ERL is caused by shift of the filter coefficient F with respect to the echo signal es. Specifically, deterioration of the ERL is caused by shift of the individual filter coefficients k1 to k6 with respect to the individual echo signals es1 to es6. Therefore, the individual filter coefficient k corresponding to the specified microphone requires update to a proper value. The "unspecified microphone" is a microphone 3 with a corresponding individual filter coefficient k that is proper (not shifted), that is, a microphone 3 that is not a target of update of the individual filter coefficient k.

First, the present device 1 detects, using the controller 50, whether a sound signal s1 is included in the transmission signal s4 (presence/absence of a sound signal s1) (ST401). Detection of presence/absence of a sound signal s1 (ST401) is the same processing as detection of presence/absence of a sound signal s1 (ST309) at the echo signal removal processing (ST3).

When no sound signal s1 is included in the transmission signal s4 (when a sound signal s1 is not present) ("NO" at ST401), the present device 1 switches the transmission path of the second input part 30 to the transmission path of the signal from the microphone 3a using the switch part 40 and the controller 50 (ST402).

The present device 1 then generates an individual transmission signal s41 using the second input part 30 based on the signal from the microphone 3a (ST403). The individual transmission signal s41 is input to the removal part 80 through the switch part 40.

The present device 1 then generates an individual removal signal (specified removal signal) s51 using the controller 50 and the removal signal generator 70 (ST404). In the processing (ST404), the controller 50 reads, from the storage 60, the individual filter coefficient k1 corresponding to the microphone 3a, and inputs the individual filter coefficient k1 to the removal signal generator 70. The removal signal generator 70 generates an individual removal signal s51 based on the reception signal s2 and the individual filter coefficient k1. The individual removal signal s51 is input to the removal part 80.

The present device 1 then removes the individual echo signal es1 included in the individual transmission signal s41 using the removal part 80, and generates an individual echo removal signal s61 (ST405). In the processing (ST405), the removal part 80 generates an individual echo removal signal s61 based on the individual transmission signal s41 and the individual removal signal s51. The individual echo removal signal s61 is input to the controller 50 and the second output part 90 from the removal part 80.

The present device 1 then measures an individual ERL using the controller 50 (ST406).

The "individual ERL" is a difference in level between the individual transmission signal s41 and the individual echo removal signal s61. Specifically, the individual ERL is magnitude (signal level) of the individual residual echo signal res11 included in the individual echo removal signal s61. The controller 50 measures the individual ERL based on the signal level of the individual transmission signal s41 and the signal level of the individual echo removal signal s61. Specifically, the controller 50 measures the individual ERL by subtracting the signal level of the individual echo removal signal s61 from the signal level of the individual transmission signal s41.

The present device 1 then compares the measured individual ERL with a predetermined threshold value V4 using the controller 50 (ST407).

The "threshold value V4" is a threshold value indicating whether removal of the individual echo signal es1 with the present device 1 is sufficient (whether the signal level of the individual residual echo signal res11 is large). Specifically, when removal of the individual echo signal es1 with the present device 1 is insufficient, the individual ERL is equal to or larger than the threshold value V4 (deteriorates). In contrast, when removal of the individual echo signal es1 with the present device 1 is sufficient, the individual ERL is smaller than the threshold value V4. The threshold value V4 is an individual reference value in the present invention. The threshold value V4 is stored in the storage 60.

When the individual ERL is smaller than the threshold value V4 ("NO" at ST407), the present device 1 specifies the microphone 3a as an unspecified microphone (ST408). In contrast, when the individual ERL is equal to or larger than the threshold value V4 ("YES" at ST407), the present device 1 specifies the microphone 3a as a specified microphone (ST409). The specification result is stored in the storage 60 (ST410). In this state, the individual echo removal signal s61 is output from the second output part 90.

The present device 1 repeats the processing (ST401 to ST410) for the signals from the other microphones 3b to 3f until all the microphones 3a to 3f are specified as specified microphones or unspecified microphones ("NO" at ST411). Specifically, the present device 1 inputs each of the individual transmission signals s42 to s46 corresponding to the other microphones 3b to 3f to the removal part 80 while switching the signals s42 to s46 using the switch part 40, and determines whether each of the microphones 3a to 3f is a specified microphone or an unspecified microphone.

The present device 1 executes update processing (ST5) when each of the microphones 3a to 3f is specified as a specified microphone or an unspecified microphone ("YES" at ST411). In this state, the microphones 3 are provided with specified microphones and unspecified microphones.

When a sound signal s1 is included in the transmission signal s4 (when a sound signal s1 is present) ("YES" at ST401), the present device 1 ends (suspends) the specification processing (ST4), and executes the echo signal removal processing (ST3). Specifically, when the controller 50 detects a sound signal s1 before the specification processing (ST4) is finished, the present device 1 suspends the specification processing (ST4), and executes the echo signal removal processing (ST3). When the specification processing (ST4) is suspended, and the sound signal s1 is determined not to be included in the transmission signal s4 in the echo signal removal processing (ST3), the present device 1 executes (resumes) the specification processing (ST4) from the suspended processing (processing on the signal from the microphone 3 that has not been specified as a specified microphone or an unspecified microphone). Specifically, for example, when the processing is suspended at point in time when the specification processing (ST4) are executed on the microphones 3a to 3d among the microphones 3a to 3f, the present device 1 resumes the processing from the specification processing (ST4) on the microphone 3e.

It should be noted that when the specification processing is suspended, the present device may execute the specification processing from the first, that is, the specification processing for all the microphones.

When the value of the individual ERL is measured as a negative value, the threshold value V4 is a negative value. In this case, the present device may reverse comparison in value between the individual ERL and the threshold value V4 in the processing (ST407) described above. Specifically, for example, when the individual ERL being a negative value is equal to or smaller than the threshold value V4, the present device may specify the microphone 3 corresponding to the individual ERL as a specified microphone.

As described above, the present device 1 determines specified microphones that is the target of update of the individual filter coefficient k, and unspecified microphones that is not the target of update of the individual filter coefficient k from the microphones 3a to 3f, based on comparison results between the individual ERL and the individual reference value (threshold value V4). Specifically, the present device 1 determines specified microphones at a timing at which an echo signal es is included in the transmission signal s4 and no sound signal s1 is included in the transmission signal s4, when the ERL deteriorates. Therefore, the present device 1 restricts microphones 3 requiring update of the individual filter coefficient k, and reduces the time and the processing load required for update of the individual filter coefficients k and update of the filter coefficient F.

Update Processing

Figure 10:
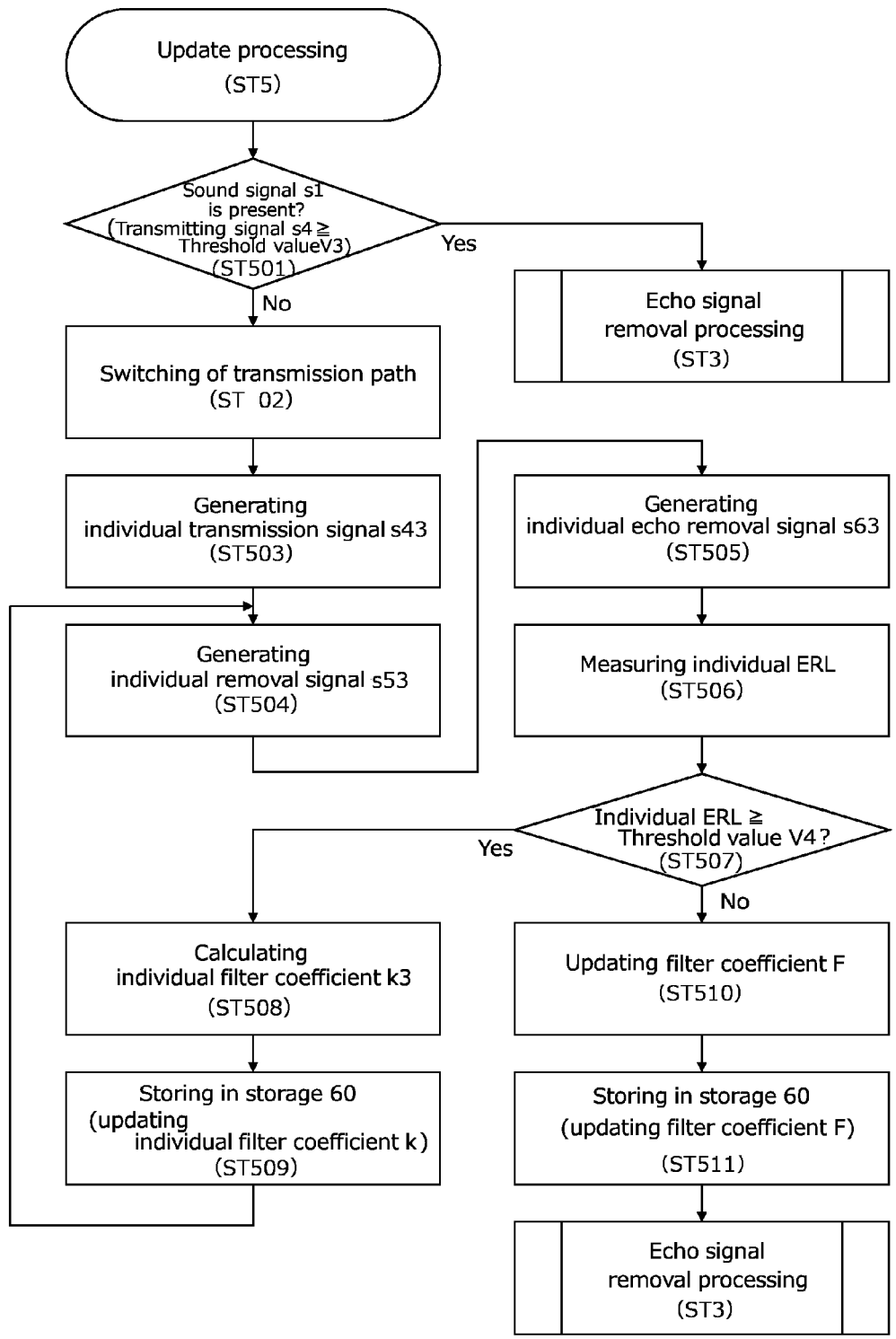
FIG. 10 is a flowchart of update processing included in the signal processing of FIG. 8.

FIG. 10 is a flowchart of the update processing (ST5).

Figure 11:
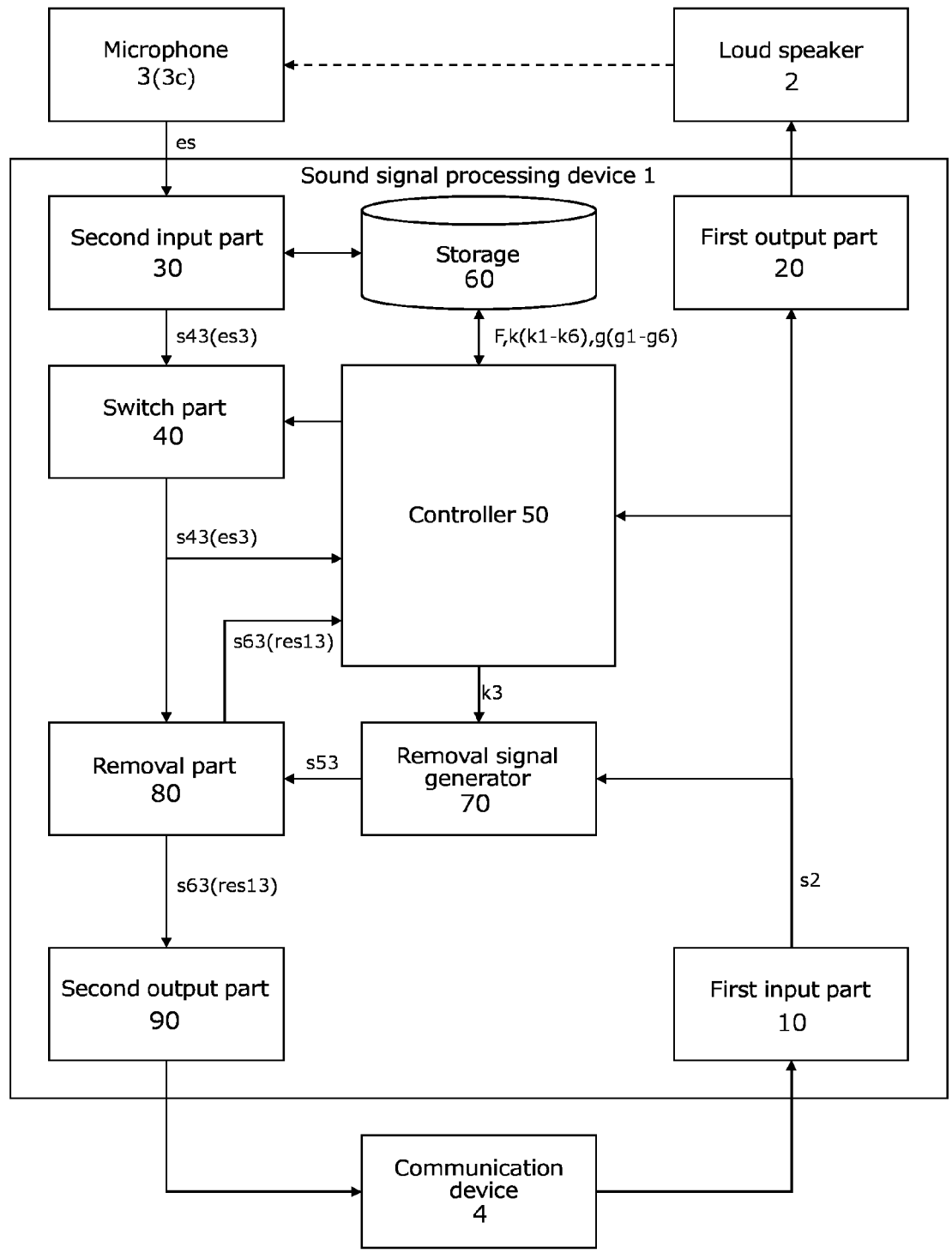
FIG. 11 is a functional block diagram illustrating flow of signals in the update processing of FIG. 10.

FIG. 11 is a functional block diagram illustrating flow of signals in the update processing (ST5).

In FIG. 11, main flows in flows of signals in the update processing (ST5) are denoted with arrows. FIG. 11 illustrates only signals corresponding to the signal from the microphone 3c.

The "update processing (ST5)" is processing to update the filter coefficient F by updating the individual filter coefficient k corresponding to the microphone 3 specified as a specified microphone. Specifically, for example, when the microphone 3a is specified as a specified microphone, the present device 1 updates the filter coefficient F by updating the individual filter coefficient k1 corresponding to the microphone 3a. When the microphones 3e and 3f are specified as specified microphones, the present device 1 updates the filter coefficient F by updating the individual filter coefficients k5 and k6 corresponding to the microphones 3e and 3f. The case where the microphone 3c is specified as a specified microphone will now be described as an example.

First, the present device 1 detects whether a sound signal s1 is included in the transmission signal s4 (or individual transmission signal s43) (presence/absence of a sound signal s1) using the controller 50 (ST501). Detection of presence/absence of a sound signal s1 (ST501) is the same processing as detection of presence/absence of a sound signal s1 (ST309) at the echo signal removal processing (ST3).

First, the present device 1 switches the transmission path of the second input part 30 to the transmission path of the signal from the specified microphone (microphone 3c) using the switch part 40 and the controller 50 (ST502).

Then, the present device 1 generates an individual transmission signal s43 based on the signal from the specified microphone (microphone 3c) (ST503).

Then, the present device 1 generates an individual removal signal s53 using the controller 50 and the removal signal generator 70 (ST504). In the processing (ST504), the controller 50 reads, from the storage 60, the individual filter coefficient k3 corresponding to the specified microphone, and inputs the individual filter coefficient k3 to the removal signal generator 70. The removal signal generator 70 generates an individual removal signal s53 based on the reception signal s2 and the individual filter coefficient k3. The individual removal signal s53 is a specified removal signal in the present invention. The individual removal signal s53 is input to the removal part 80.

The present device 1 then removes the individual echo signal es3 included in the individual transmission signal s43 using the removal part 80, and generates an individual echo removal signal s63 (ST505). The individual echo removal signal s63 is a specified echo removal signal in the present invention. The individual echo removal signal s63 is input to the controller 50 and the second output part 90.

The present device 1 then measures the individual echo return loss (individual ERL) using the controller 50 (ST506).

The present device 1 then compares the measured individual ERL with the predetermined threshold value V4 using the controller 50 (ST507).

When the individual ERL is equal to or larger than the threshold value V4 ("YES" at ST507), the present device 1 calculates an individual filter coefficient k3 using the controller 50 (ST508). In the processing (ST508), the controller 50 reads, from the storage 60, the gain value g3 set for the transmission path of the signal from the specified microphone. The controller 50 calculates an individual filter coefficient k3 based on the read gain value g3, the individual echo removal signal s63 (that is, the individual residual echo signal res13 included in the individual (specified) echo removal signal s63), the reception signal s2, and the environment measurement result.

The present device 1 then stores the calculated individual filter coefficient k3 in the storage 60. Specifically, the present device 1 updates the individual filter coefficient k3 stored in the storage 60 (ST509). The process of the present device 1 then returns to the processing (ST504).

In contrast, when the individual ERL is smaller than the threshold value V4 ("NO" at ST507), the present device 1 updates the filter coefficient F stored in the storage 60 using the controller 50 (ST510). In the processing (ST510), the controller 50 reads, from the storage 60, the updated individual filter coefficient k3 corresponding to the specified microphone, the individual filter coefficients k1, k2, and k4 to k6 corresponding to the unspecified microphones, and the gain values g1 to g6 set for the respective transmission paths, and calculates the filter coefficient F. The filter coefficient F is calculated in the same manner as the processing (ST208) of the initial learning processing (ST2).

The present device 1 then stores the calculated filter coefficient F in the storage 60. Specifically, the present device 1 updates the filter coefficient F stored in the storage 60 (ST511). The process of the present device 1 then returns to the echo signal removal processing (ST3).

As described above, the present device 1 specifies the microphone 3 having the deteriorated individual ERL as a specified microphone in the specification processing (ST4), and executes update processing (ST5) only for the specified microphone. As a result, the processing load required for update of the filter coefficient F is reduced, and the processing time is shortened.

In addition, the present device 1 always compares the ERL with the threshold value V2 (that is, monitors the ERL) in the echo signal removal processing (ST3). When the ERL is equal to or larger than the threshold value V2, the present device 1 executes the specification processing (ST4) and the update processing (ST5) at a timing at which an echo signal es is included in the transmission signal s4 and no sound signal s1 is included in the transmission signal s4. In the specification processing (ST4), the present device 1 compares the individual ERL with the threshold value V4 for each of the microphones 3. When the individual ERL is equal to or larger than the threshold value V4, the present device 1 determines a specified microphone that is the target of update of the individual filter coefficient k. In the update processing (ST5), the present device 1 calculates an individual filter coefficient k corresponding to the specified microphone, based on the reception signal s2 and the individual residual echo signal res10 included in the individual echo removal signal (specified echo removal signal) s60. The present device 1 calculates and updates the filter coefficient F based on the individual filter coefficient k corresponding to the specified microphone and the individual filter coefficients k corresponding to the unspecified microphones.

CONCLUSION

According to the embodiment described above, the controller 50 calculates the individual filter coefficients k1 to k6 corresponding to the respective microphones 3a to 3f, and calculates the filter coefficient F by combining the individual filter coefficients k1 to k6. The removal signal generator 70 generates a removal signal s5 based on the calculated filter coefficient F. The removal part 80 removes the echo signal es (generates an echo removal signal s6) included in the transmission signal s4, based on the transmission signal s4 and the removal signal s5. Therefore, the present device 1 can remove echo signals es included in the signals from a plurality of microphones 3 (multi-channels) with a common FIR filter (removal signal generator 70), as opposed to a conventional device including echo cancel parts corresponding to the respective microphones. Specifically, the present device 1 provides a simple circuit configuration in comparison with a conventional device. That is, the present device 1 removes echo signals es included in signals from a plurality of microphones 3, with a simple circuit configuration of using a common FIR filter.

In addition, according to the embodiment described above, the controller 50 calculates (updates) the filter coefficient F, when no sound signal s1 is included in the transmission signal s4 and an echo signal es is included in the transmission signal s4 (when a reception signal s2 is present). Therefore, the present device 1 reduces the processing load of calculation (update) of the filter coefficient F, in comparison with a conventional device that always calculates (updates) the filter coefficient.

In addition, according to the embodiment described above, the switch part 40 inputs each of the individual transmission signals s41 to s46 to the controller 50 while switching the individual transmission signals s41 to s46, when no sound signal s1 is included in the transmission signal s4 and an echo signal es is included in the transmission signal s4 (when a reception signal s2 is present). The controller 50 calculates individual filter coefficients k1 to k6 corresponding to the respective microphones 3a to 3f, based on the signals from the respective microphones 3a to 3f. Specifically, the present device 1 calculates the individual filter coefficients k1 to k6 while switching the individual transmission signals s41 to s46 with the switch part 40. Therefore, the present device 1 can calculate individual filter coefficients k1 to k6 corresponding to the six microphones 3a to 3f with a common FIR filter (removal signal generator 70). Specifically, the present device 1 calculates individual filter coefficients k corresponding to a plurality of microphones 3 with a simple circuit configuration, and calculates a filter coefficient F based on the individual filter coefficients k. As a result, the present device 1 removes echo signals es included in signals from a plurality of microphones 3 with a simple circuit configuration.

In addition, according to the embodiment described above, the controller 50 calculates the individual filter coefficients k, based on the reception signal s2 and the individual residual echo signal resl0 included in the individual echo removal signal s60. Specifically, the present device 1 improves the accuracy of the filter coefficient F and securely removes (suppresses) the echo signal es from the transmission signal s4, by repeatedly calculating the individual filter coefficient k such that the individual residual echo signal resl0 becomes approximately equal to "0".

In addition, according to the embodiment described above, the controller 50 updates the individual filter coefficients k1 to k6 based on the gain values g1 to g6 corresponding to the respective microphones 3a to 3f. Therefore, the present device 1 can calculate the individual filter coefficients k1 to k6 using the gain values g1 to g6 at the time when the microphones 3a to 3f have collected the echo components. As a result, the present device 1 can securely improve the accuracy of the filter coefficient F and remove (suppress) the echo signal es from the transmission signal s4.

In addition, according to the embodiment described above, the controller 50 always measures the ERL in the echo signal removal processing (ST3). The controller 50 then updates the filter coefficient F stored in the storage 60, when the ERL is equal to or larger than the reference value (threshold value V2) and no sound signal s1 is included in the transmission signal s4. Specifically, the present device 1 senses environmental change at a timing at which the ERL deteriorates, and updates the filter coefficient F. Specifically, the present device 1 reduces the processing load of calculation (update) of the filter coefficient F, in comparison with a conventional device that always calculates (updates) the filter coefficient F.

In addition, according to the embodiment described above, the controller 50 measures the individual ERLs based on a comparison result between the ERL and the reference value (threshold value V2). As a result, the present device 1 detects shift (deterioration in the removal and suppression effect for the echo signal es) of the filter coefficient F from the measurement results of ERLs corresponding to the respective microphones 3a to 3f, when the ERL deteriorates.

In addition, according to the embodiment described above, the controller 50 determines a specified microphone that is the target of update of the individual filter coefficient k among the microphones 3a to 3f, based on comparison results between the individual ERL and the individual reference value (threshold value V4). Specifically, the present device 1 reduces the time and the processing load necessary for update of the individual filter coefficients k and update of the filter coefficient F, by determining a specified microphone when the ERL deteriorates.

In addition, according to the embodiment described above, the controller 50 calculates the individual filter coefficient k of the specified microphone. The controller 50 then updates the filter coefficient F stored in the storage 60, based on the calculated individual filter coefficient k of the specified microphone and the individual filter coefficients k of the unspecified microphones. Therefore, the present device 1 updates the filter coefficient F by calculating (updating) only the individual filter coefficient k of the specified microphone. Specifically, the present device 1 reduces the time and the processing load necessary for update of the individual filter coefficients k and update of the filter coefficient F.

In addition, according to the embodiment described above, the controller 50 executes environment measurement for each of the microphones 3, and calculates the individual filter coefficient k based on the measurement result of the environment measurement. Therefore, the present device 1 can calculate the filter coefficient F in accordance with the environment of the room (space) in which the present device 1 is installed.

As described above, according to the embodiment described above, the present device 1 calculates the filter coefficient F based on the initialization processing (ST1) and the initial learning processing (ST2), and executes echo canceling based on the filter coefficient F (executes the echo signal removal processing (ST3)). When the present device 1 senses environmental change during execution of the echo signal removal processing (ST3), the present device 1 provides automatic adjustment of the filter coefficient F by executing the specification processing (ST4) and the update processing (ST5). As a result, the present device 1 executes multi-channel echo cancelling with a common filter, and executes echo canceling automatically following environmental change.

It should be noted that the number of microphones connected with the second input part may be any number larger than 1, and not limited to "6".

In the embodiment described above, the present device 1 has a configuration including a pair of the removal signal generator 70 and the removal part 80. Therefore, the removal signal generator 70 is exclusively used for generation of the individual removal signal s50 in the specification processing (ST4) and the update processing (ST5). As a result, the present device 1 does not execute the echo signal removal processing (ST3) simultaneously with the specification processing (ST4) and the update processing (ST5).

Instead of the configuration, the present device may include two pairs of removal signal generators and removal parts, a pair of a removal signal generator and a removal part used for the echo signal removal processing and a pair of a removal signal generator and a removal part used for the specification processing and the update processing.

Figure 12:
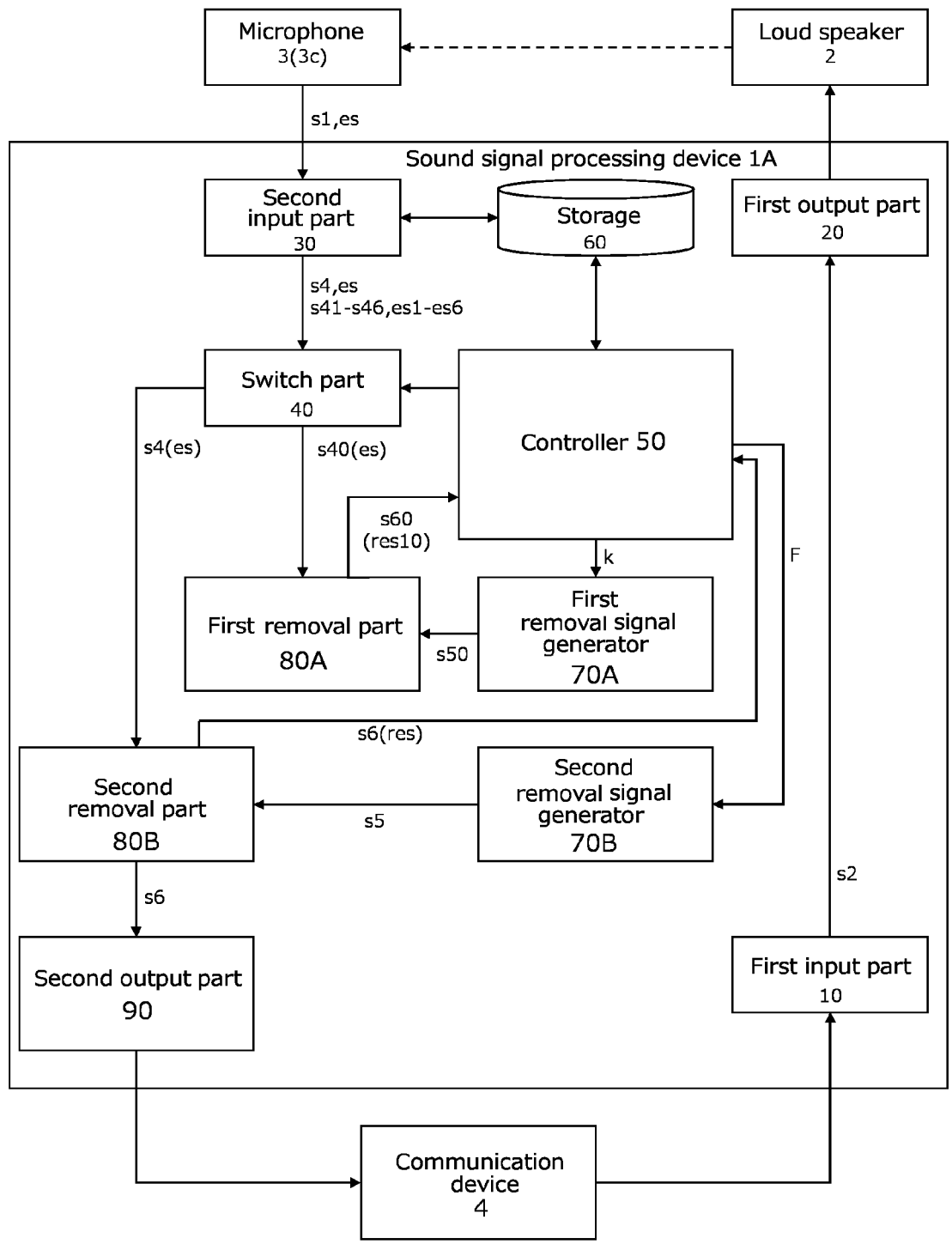
FIG. 12 is a functional block diagram illustrating another embodiment of the present invention.

FIG. 12 is a functional block diagram illustrating another embodiment of the present device.

FIG. 12 illustrates that the present device 1A is a sound signal processing device including a first removal signal generator 70A, a second removal signal generator 70B, a first removal part 80A, and a second removal part 80B. The first removal signal generator 70A and the first removal part 80A execute the specification processing (ST4) and the update processing (ST5). The second removal signal generator 70B and the second removal part 80B execute the echo signal removal processing (ST3).

With this configuration, the present device 1A can execute the echo signal removal processing (ST3) simultaneously with the specification processing (ST4) and the update processing (ST5). Therefore, the present device 1A can remove (suppress) the echo signals es included in signals from two or more microphones 3, with a simple circuit configuration including two echo canceller parts.

The invention claimed is:

1. A sound signal processing device comprising:
an output part that outputs a reception signal;
an input part that combines signals input from each of a plurality of microphones and generates a transmission signal, wherein the microphones collect an echo component of the reception signal and voice of a speaker and generate an echo signal corresponding to the echo component and a sound signal corresponding to the voice of the speaker;
a removal signal generator that generates a removal signal which removes the echo signal included in the transmission signal, based on a filter coefficient;
a controller that calculates the filter coefficient; and
a removal part that generates an echo removal signal based on the transmission signal and the removal signal, wherein
the controller calculates individual filter coefficients corresponding to the respective microphones, multiplies the individual filter coefficient corresponding to respective microphones by a gain value corresponding to respective microphones, and calculates the filter coefficient by adding each of the multiplied values.

2. The sound signal processing device according to claim 1, wherein the controller calculates the filter coefficient when the sound signal is not included in the transmission signal.

3. The sound signal processing device according to claim 2, wherein the controller calculates the filter coefficient when the echo signal is included in the transmission signal.

4. The sound signal processing device according to claim 1, wherein the removal signal generator generates the removal signal based on the reception signal and the filter coefficient.

5. The sound signal processing device according to claim 1, further comprising:
a switch part that switches the signal input to the removal part in individual transmission signals corresponding to the respective microphones, wherein
the input part generates the individual transmission signals corresponding to the respective microphones based on the signals input from the respective microphones, and generates the transmission signal by combining the individual transmission signals, and
the switch part inputs the individual transmission signals corresponding to the respective microphones to the removal part while switching the individual transmission signals, when the sound signal is not included in the transmission signal.

6. The sound signal processing device according to claim 5, wherein the switch part inputs the individual transmission signals corresponding to the respective microphones to the removal part while switching the individual transmission signals, when the echo signal is included in the transmission signal.

7. The sound signal processing device according to claim 5, wherein
the removal signal generator generates individual removal signals that removes the echo signals included in the individual transmission signals,
the removal part generates individual echo removal signals based on the individual transmission signals and the individual removal signals, and
the controller calculates the individual filter coefficients based on the reception signal and individual residual echo signals included in the individual echo removal signals.

8. The sound signal processing device according to claim 1, further comprising:
a storage that stores therein the filter coefficient, wherein the controller updates the filter coefficient stored in the storage, when the sound signal is not included in the transmission signal.

9. The sound signal processing device according to claim 8, wherein
the storage stores therein a reference value, and
the controller:
measures an echo return loss based on a signal level of the transmission signal and a signal level of the echo removal signal, and
updates the filter coefficient based on a comparison result between the echo return loss and the reference value.

10. The sound signal processing device according to claim 9, wherein the controller measures individual echo return losses corresponding to the respective microphones based on the comparison result.

11. The sound signal processing device according to claim 10, wherein
the storage stores therein individual reference values, and
the controller:
compares the individual echo return loss with the individual reference value for each of the microphones, and
determines a specified microphone which is a target of update of the individual filter coefficient among the microphones based on comparison results between the individual echo return losses and the individual reference values.

12. The sound signal processing device according to claim 11, wherein
the microphones include:
the specified microphone; and
an unspecified microphone different from the specified microphone, wherein
the removal signal generator generates a specified removal signal which removes the echo signal included in the signal from the specified microphone, based on the individual filter coefficient corresponding to the specified microphone,
the removal part generates a specified echo removal signal based on the signal from the specified microphone and the specified removal signal, and
the controller:
calculates the individual filter coefficient corresponding to the specified microphone based on the reception signal and an individual residual echo signal included in the specified echo removal signal, and
updates the filter coefficient stored in the storage, based on the individual filter coefficients corresponding to the unspecified microphone and the individual filter coefficient corresponding to the specified microphone.

13. The sound signal processing device according to claim 1, wherein
the controller:
executes environment measurement for each of the microphones, and
calculates the individual filter coefficients based on results of the environment measurement corresponding to the respective microphones.

14. A sound signal processing program causing a computer to function as the sound signal processing device according to claim 1.

15. A sound signal processing method executed by a sound signal processing device including:
an output part that outputs a reception signal;
an input part that combines signals input from each of a plurality of microphones and generates a transmission signal, wherein the microphones collect an echo component of the reception signal and voice of a speaker and generate an echo signal corresponding to the echo component and a sound signal corresponding to the voice of the speaker;

a removal signal generator that generates a removal signal removing the echo signal included in the transmission signal, based on a filter coefficient;

a controller that calculates the filter coefficient; and a removal part that generates an echo removal signal based on the transmission signal and the removal signal, the method including:

calculating individual filter coefficients corresponding to the respective microphones with the controller;

multiplying the individual filter coefficient corresponding to respective microphones by a gain value corresponding to respective microphones; and calculating the filter coefficient by adding each of the multiplied values.

16. The sound signal processing method according to claim 15, wherein the controller executes the calculating the individual filter coefficients when the echo signal is included in the transmission signal and the sound signal is not included in the transmission signal.

17. The sound signal processing method according to claim 15, wherein the sound signal processing device includes a storage that stores therein the filter coefficient, and the controller updates the filter coefficient stored in the storage when the sound signal is not included in the transmission signal.

18. The sound signal processing method according to claim 17, wherein the storage stores therein a reference value and individual reference values, and the controller:

measures, for each of the microphones, an echo return loss based on a signal level of the transmission signal and a signal level of the echo removal signal, measures individual echo return losses corresponding to the respective microphones based on a comparison result between the echo return loss and the reference value, determines a specified microphone which is a target of update of the individual filter coefficient among the microphones based on comparison results between the individual echo return losses and the individual reference values, and updates the filter coefficient.

* * * * *